United States Patent
Yang et al.

(10) Patent No.: US 7,085,098 B1
(45) Date of Patent: Aug. 1, 2006

(54) DISK DRIVE INCLUDING A DISK PLATE OVERLAPPING A DISK SPACER IN A CIRCUMFERENTIAL DISK SPACER OPENING

(75) Inventors: Lin Yang, San Jose, CA (US); Jin Hui Ou-Yang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 330 days.

(21) Appl. No.: 10/741,604

(22) Filed: Dec. 19, 2003

(51) Int. Cl.
*G11B 17/02* (2006.01)

(52) U.S. Cl. ............................ 360/97.03; 360/98.08
(58) Field of Classification Search ............... None
See application file for complete search history.

(56) References Cited

U.S. PATENT DOCUMENTS

| | | | |
|---|---|---|---|
| 5,134,530 A * | 7/1992 | Hall | 360/97.03 |
| 6,097,568 A * | 8/2000 | Ekhoff | 360/97.02 |
| 6,212,030 B1 | 4/2001 | Koriyama et al. | 360/98.08 |
| 6,882,501 B1 * | 4/2005 | Machcha et al. | 360/97.03 |
| 6,903,899 B1 | 6/2005 | Sakata et al. | |
| 6,937,433 B1 | 8/2005 | Dahlenburg et al. | |
| 6,972,926 B1 * | 12/2005 | Codilian | 360/97.02 |
| 2002/0015255 A1 | 2/2002 | Tadepalli et al. | |
| 2002/0135933 A1 * | 9/2002 | Harrison et al. | 360/97.02 |
| 2003/0202276 A1 | 10/2003 | Smith | |
| 2004/0125488 A1 | 7/2004 | Zhu et al. | |
| 2005/0286162 A1 * | 12/2005 | Sasaki | 360/97.01 |
| 2006/0028760 A1 | 2/2006 | Zuo et al. | |
| 2006/0028761 A1 | 2/2006 | Zuo et al. | |

OTHER PUBLICATIONS

Office Action dated Mar. 23, 2006, U.S. Appl. No. 10/741,280.

* cited by examiner

*Primary Examiner*—Jefferson Evans

(57) ABSTRACT

There is provided a disk drive including a disk drive base and a spindle motor hub. The disk drive further includes first and second disks disposed about the spindle motor hub. The disk drive further includes a disk spacer disposed about the spindle motor hub between the first and second disks. The disk spacer includes a circumferential disk spacer opening. The disk drive including a plate body extending between the first and second disks for modifying air flow adjacent the first and second disks during operation of the disk drive, and an inner edge extending from the plate body and disposed towards the hub, the inner edge being disposed within the disk spacer opening overlapping the disk spacer in a direction parallel to the axis of rotation for mitigating against contact between the inner edge and the first and second disks.

13 Claims, 5 Drawing Sheets

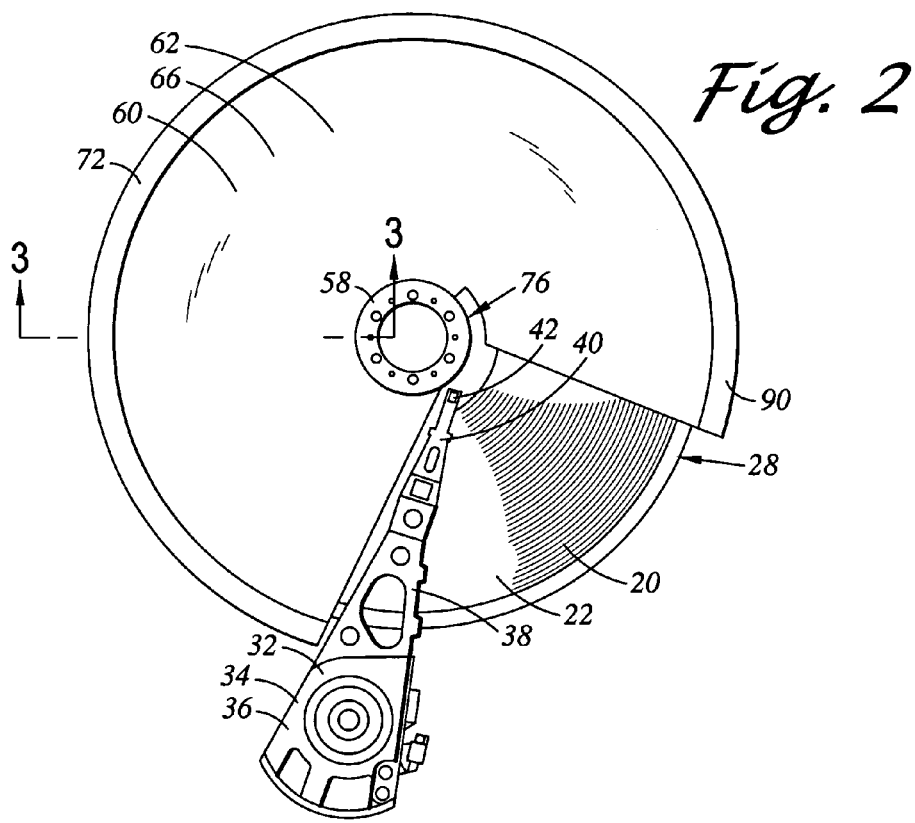
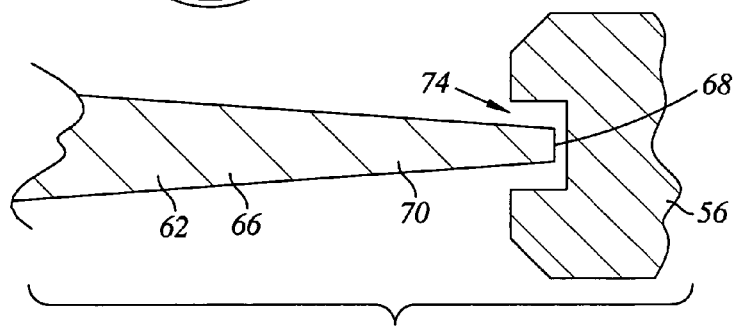
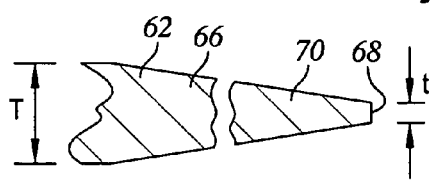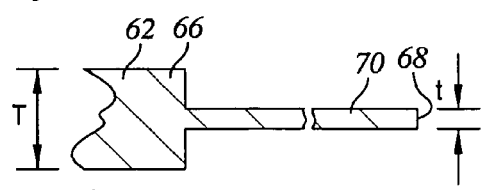

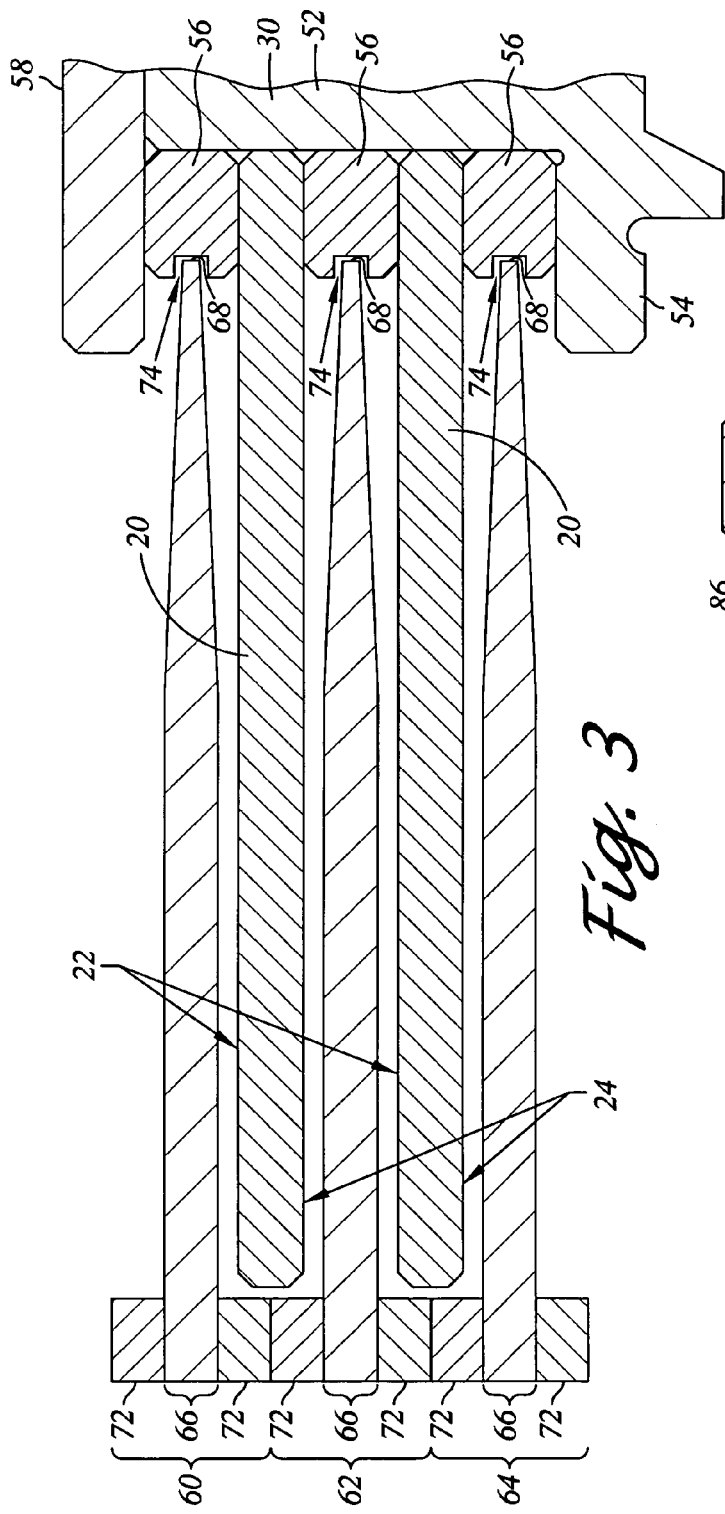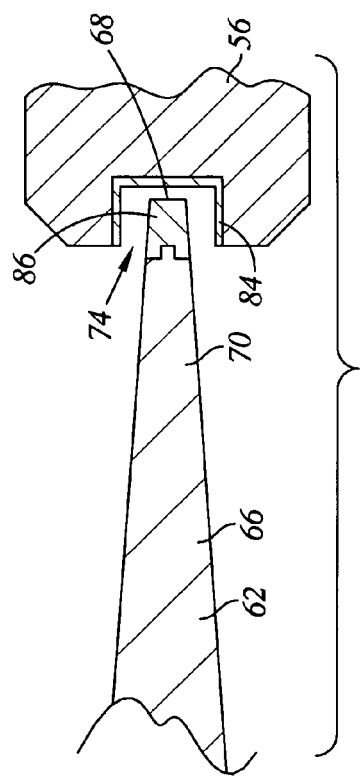

DISK DRIVE INCLUDING A DISK PLATE OVERLAPPING A DISK SPACER IN A CIRCUMFERENTIAL DISK SPACER OPENING

BACKGROUND OF THE INVENTION

1. Field of the Invention

The present invention relates generally to disk drives, and in particular to a disk drive including a disk plate with a reduced thickness inner edge disposed towards a spindle motor hub.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA) that includes a transducer head supported by a slider (collectively referred to as "head" or "slider") for reading and writing data from and to the disk.

The spindle motor includes a spindle motor hub that is rotatably coupled to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft and therefore the spindle motor base typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes an actuator assembly including the sliders and a flex circuit cable assembly attached to the actuator assembly. A conventional "rotary" actuator assembly (also referred to as "rotary actuator" or simply "actuator") typically comprises an actuator body, a pivot bearing cartridge, a coil portion that extends from one side of the actuator body to interact with one or more permanent magnets to form a voice coil motor, and one or more actuator arms which extend from an opposite side of the actuator body to a distal end of the actuator assembly. The actuator body includes a bore and the pivot bearing cartridge engaged within the bore for allowing the actuator body to rotate between limited positions. At least one head gimbal assembly (HGA) is distally attached to each of the actuator arms. Each head gimbal assembly biases a head towards the disk. In this regard, the actuator assembly is controllably rotated so as to move the heads relative to the disks for reading and writing operations with respect to the tracks contained on the disks.

A topic of concern is the desire to reduce the effects of airflow generated within the disk drive due to rotation of the disks. Of particular concern is the occurrence of turbulent airflow that may tend to excite a resonance response of the actuator assembly. This results in an increase in the percent off-track values of the associated head. Further, such disk rotation induced airflow may result in a force applied to the actuator assembly, i.e., windage. In addition, such disk rotation induced airflow may result in vibration of the disk or disk flutter. In order to address such problems associated with disk rotation induced airflow, one or more disk plates or anti-disks may be interleaved between the disks. These disk plates extend radially immediately along the disk surfaces for altering the disk rotation induced airflow patterns. This has been found to be effective in mitigating the otherwise negative effects of disk rotation induced airflow.

There is a concern with respect to undesirable contact between the disk plates and the disks. This is because of the inherent close proximity between the disk plates and the disks. Such contact may result in mechanical damage to the disks and electro-static discharge events. It is contemplated that the disk plates may be subject to some degree of deflection upon the disk drive experiencing a significant change in acceleration. In particular, a disk plate may include an inner edge disposed adjacent the spindle motor hub. During such a mechanical shock event, this inner edge may deflect vertically towards the adjacent disks. Should the deflection be large enough, contact between the disk plate at this inner edge and the adjacent disks may occur. Accordingly, there is a need in the art for an improved disk drive and disk plate configuration in comparison to the prior art.

SUMMARY OF THE INVENTION

According to an aspect of the present invention, there is provided a disk drive. The disk drive includes a disk drive base. The disk drive further includes a spindle motor hub rotatably coupled to the disk drive base and configured to rotate about an axis of rotation. The disk drive further includes first and second disks disposed about the spindle motor hub. The disk drive further includes a disk spacer disposed about the spindle motor hub between the first and second disks. The disk spacer includes a circumferential disk spacer opening. The disk drive further includes a disk plate coupled to the disk drive base. The disk plate includes a plate body extending between the first and second disks for modifying air flow adjacent the first and second disks during operation of the disk drive. The disk plate further includes an inner edge extending from the plate body and disposed towards the hub. The inner edge being disposed within the disk spacer opening overlapping the disk spacer in a direction parallel to the axis of rotation for mitigating against contact between the inner edge and the first and second disks. According to various embodiments, the disk spacer may include a disk spacer body, and the disk spacer opening is formed in the disk spacer body with the disk spacer opening being groove-shaped. In another embodiment, the disk spacer includes a disk spacer body and a pair of flanges radially extending from the disk spacer body, and the disk spacer opening defined by the disk spacer body and the flanges. The disk plate may include an inner section, and the inner section extends from the plate body towards the hub with the inner section including the inner edge. The inner section may be tapered from the plate body to the inner edge. In another embodiment, the inner section has a substantially uniform thickness of the inner edge thickness. As such, the inner section may be step-shaped in relation to the plate body. The inner section may be formed of a material different than the plate body, such as of a substantially electrically non-conductive material. The disk spacer may further include a disk spacer opening liner disposed within the disk spacer opening. The disk spacer opening liner may be formed of a material different than a remainder of the disk spacer. The disk spacer opening liner may be formed of a substantially electrically non-conductive material. The plate body thickness may be is substantially uniform between the first and second disks. The disk plate may be a first disk plate, and the disk drive may further include a second disk plate with the first disk is disposed between the first and second disk plates.

BRIEF DESCRIPTION OF THE DRAWINGS

FIG. 2 is an enlarged top plan view of a portion of a head stack assembly, a disk plate and a disk of the disk drive of FIG. 1;

FIG. 3 is a cross sectional side view of the disk plate and the disk as well as a portions of a spindle motor, a disk clamp and disk spacers as seen along axis 3—3 of FIG. 2;

FIG. 4 is an enlarged cross sectional side view of a portion of a disk plate and disk spacer of FIG. 3;

FIG. 5 is an enlarged cross sectional side view of an inner edge of a portion of the disk plate of FIG. 4; and FIG. 6 is view similar to that of FIG. 5, however, of a disk plate according to another embodiment;

FIG. 7 is a view similar to that of FIG. 4, however, with the disk plate having an inner section of a different material type and the disk spacer including a disk spacer opening liner according to another embodiment;

DESCRIPTION OF THE PREFERRED EMBODIMENTS

Figure 1:
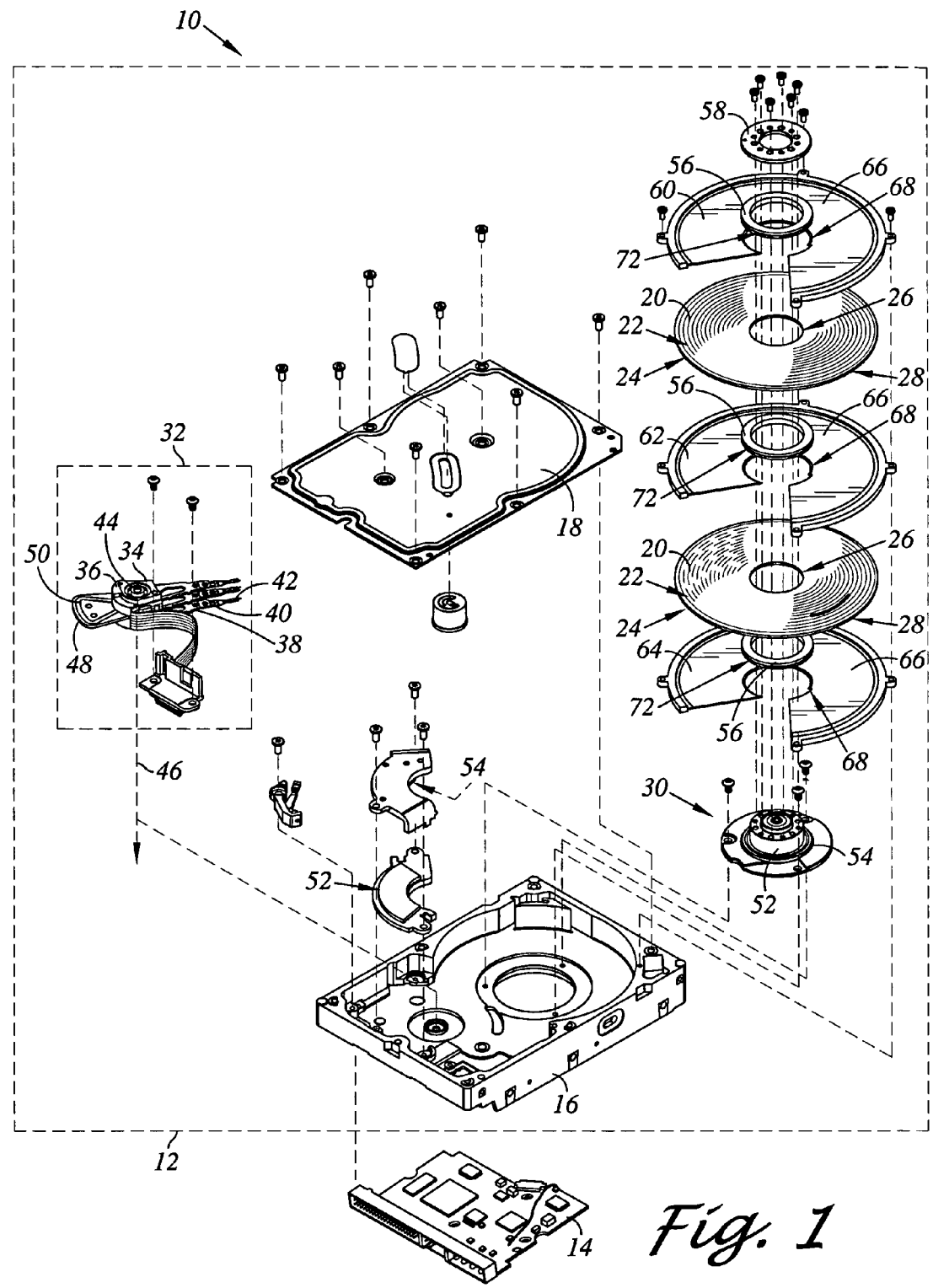
FIG. 1 is an exploded perspective view of a disk drive in accordance with an aspect of the present invention.

Referring now to the drawings wherein the showings are for purposes of illustrating preferred embodiments of the present invention only, and not for purposes of limiting the same, FIGS. 1–10 illustrate a disk drive including a disk plate in accordance with aspects of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house at least one magnetic disk 20. While two disks 20 are shown, a single disk or multiple disks may be provided. Each disk 20 contains a plurality of tracks for storing data. The tracks are disposed upon opposing first and second disk surfaces 22, 24 of the disk 20 that extend between an inner disk edge 26 (associated with the inner diameter) and an outer disk edge 28 (associated with the outer diameter) of the disk 20. The head disk assembly 12 further includes a spindle motor 30 for rotating the disks 20. The head disk assembly 12 further includes a head stack assembly 32 rotatably attached to the disk drive base 16 in operable communication with the disks 20. The head stack assembly 32 includes a rotary actuator 34.

The actuator 34 includes an actuator body 36 and actuator arms (for ease of illustration, only a lowermost one being denoted 38) that extend from the actuator body 36. Distally attached to the actuator arms (the lowermost one being denoted 38) are head gimbal assemblies (the lowermost one denoted 40). The head gimbal assemblies 40 each includes a slider (the lowermost one denoted 42). Each of the sliders 42 includes a transducer head. The head gimbal assemblies 40 with the sliders 42 not attached are referred to as suspension assemblies. It is contemplated that the number of actuator arms and suspension assemblies may vary depending upon the number of disks and disk surfaces utilized.

The actuator body 36 includes a bore, and the actuator 34 further includes a pivot bearing cartridge 44 engaged within the bore for facilitating the actuator body 36 to rotate between limited positions about an axis of rotation 46. The actuator 34 further includes a coil support 48 that extends from one side of the actuator body 36 opposite the actuator arms 38. The coil support 48 is configured to support an actuator coil 50.

A pair of magnetic elements 52, 54 is supported by mounts which are attached to the disk drive base 16 (magnetic element 54 is indicated by the dashed lead line and it is understood the magnetic element 54 is disposed underneath the upper mount). The coil 50 interacts with the magnetic elements 52, 54 to form a voice coil motor for controllably rotating the actuator 34. The head stack assembly 32 further includes a flex cable assembly 60 and a cable connector 62. The cable connector 62 is attached to the disk drive base 16 and is disposed in electrical communication with the printed circuit board 14. The flex cable assembly 60 supplies current to the actuator coil 52 and carries signals between the transducer heads 42 and the printed circuit board assembly 14.

The spindle motor 30 includes a spindle motor hub 52 that is rotatably coupled to the disk drive base 16. The spindle motor hub 52 has an outer hub flange 54 that supports a lowermost one of the disks 20. Additional disks 20 may be stacked and separated with annular disk spacers 56 that are disposed about the spindle motor hub 52. A disk clamp 58 may be provided to secure the disks 20 and the disk spacers 56 to the spindle motor hub 52. As will be discussed in detail below, the disk drive 10 may include disk plates 60, 62, 64 that are interleaved with the disks 20.

Referring additionally to FIG. 2 there is depicted an enlarged top plan view of a portion of the head stack assembly 32, the disk plate 60 and the disk 20. Further referring to FIG. 3 there is depicted a cross sectional side view of the disk plates 60, 62, 64 and the disks 20 as well as a portions of the spindle motor 30, the disk clamp 58 and the disk spacers 56 as seen along axis 3—3 of FIG. 2.

According to an aspect of the present invention, there is provided the disk drive 10. The disk drive 10 includes the disk drive base 16. The disk drive 10 further includes the spindle motor hub 52 rotatably coupled to the disk drive base 16 and configured to rotate about the axis of rotation 46. The disk drive 10 further includes the disks 20 disposed about the spindle motor hub 52. The disk drive 10 further includes a disk plate, such as disk plate 62, coupled to the disk drive base 16. The disk drive 10 further includes a disk spacer 56 disposed about the spindle motor hub 52 between the disks 20. The disk spacer 56 includes a circumferential disk spacer opening 78. The disk drive 10 further includes a disk plate, such as disk plate 62, coupled to the disk drive base 16. The disk plate 62 includes a plate body 66 extending between the disks 20 for modifying air flow adjacent the disks 20 during operation of the disk drive 10. The disk plate 62 further includes an inner edge 68 extending from the plate body 66 and disposed towards the spindle motor hub 52. The inner edge 68 is disposed within the disk spacer opening 78 overlapping the disk spacer 56 in a direction parallel to the axis of rotation 46 for mitigating against contact between the inner edge 68 and the disks 20.

In further detail, FIG. 4 is an enlarged cross sectional side view of a portion of the disk plate 62 and disk spacer 56 of FIG. 3. FIG. 5 is an enlarged cross sectional side view of the inner edge 68 of a portion of the disk plate 62 of FIG. 4. It is understood that upon deflection of the plate body 66 the portion of the plate body 66 that would undergo the greatest amount of vertical deflection (i.e., in a direction parallel to the axis of rotation 46) would occur at the inner edge 68. Such deflection may be a result of the disk drive experiencing a sudden acceleration such as during a substantial mechanical shock event. Should such deflection of the plate body 66 be large enough, contact between the plate body 66 and the adjacent disk 20 would occur adjacent the inner edge 68 in the absence of the overlapping nature of the disk plate 62 and the disk spacer 56. Thus the disk spacer opening 78 is configured to function as a limiter with respect to vertical deflections of the plate body 66.

The inner edge 68 includes the edge thickness denoted "t" in a direction parallel to the axis of rotation 46 that is less than the plate body thickness denoted "T". The inner edge 68 is configured to contact the spacer 56 so as to avoid contact between the plate body 66 and the disks 20.

As mentioned above, the plate body 66 extends between the disks 20 for modifying air flow adjacent the disks 20 during operation of the disk drive 10. In this regard, a substantial coverage adjacent of the disk surfaces 22, 24 is desirable. In the embodiment shown, the respective plate bodies 66 extend from the outer disk edges 28 of the disks 20 to immediately adjacent the disk spacers 56. It is understood however that such coverage is not required, only that the plate body 66 extend radially adjacent some portion of the disks 20. Further, in the embodiment shown as best seen in FIG. 2, the plate body 66 extends in an arced-shape approximately 270 degrees with a "cutout" portion for accommodation of the head stack assembly 32. It is understood however that such substantial circumferential coverage of the disks 20 is not required, only that the plate body 66 extend adjacent some portion of the disks 20. Further, as can be seen, the plate body 66 includes a notch 76 for accommodating the assembly of the disk spacers 56 in relation to the disk plates 60, 62, 64.

As best seen in FIGS. 3 and 4, the disk plates 60, 62, 64 may each include outer supports 72. The outer supports 72 may be stacked and commonly screw mounted to the disk drive base 16. It is contemplated that other attachment configurations may be implemented as chosen from those which are well known to one of ordinary skill in the art.

As seen in the cross sectional view of FIG. 3, the plate body thickness T may be substantially uniform between the disks 20. Such uniformity is considered in the context of the overall plate body 66. Thus, even a plate body 66 that includes rib structures for mechanical strength characteristics or surface texturing may still be considered uniform. This would be in contrast to a configuration which is stepped or tapered across the plate body 66 for example.

As best shown in FIGS. 4 and 5, the disk plate 66 may include an inner section 70 which extends the plate body 66 towards the spindle motor hub 52. The inner section 70 includes the inner edge 68. The inner section 70 is tapered from the plate body 66 to the inner edge 68. While the inner section 72 is shown to begin approximately halfway along the radial portion of the disks, as seen in FIG. 3, the radial dimensioning of the inner section 72 may be adjusted to any length for the desired taper.

Referring now to FIG. 6, there is depicted a view similar to that of FIG. 5, however, of a disk plate 62 according to another embodiment. In this embodiment, the inner section 70 has a substantially uniform thickness of the inner edge thickness t. As such, the inner section 70 may be step-shaped in relation to the plate body 66.

Referring now to FIG. 7, there is depicted a view similar to that of FIG. 4, however, according to another embodiment. In this embodiment the disk plate 62 includes an inner section 86 formed of a different material than that of the plate body 66, such as of a substantially electrically non-conductive material. Such differing material type may be used to mitigate against undesirable electro-static discharge events between the disk plate 62 and the disk spacer 56. Further, the disk spacer 56 includes a disk spacer opening liner 84 disposed within the disk spacer opening 74. The disk spacer opening liner 84 may be formed of a material different than a remainder of the disk spacer 56. The disk spacer opening liner 84 may be formed of a substantially electrically non-conductive material. Such differing material type may be used to mitigate against undesirable electro-static discharge events between the disk plate 62 and the disk spacer 56. While both the inner section 86 of the differing material type is shown in conjunction with the disk spacer opening liner 84, it is understood the inner section 86 may be implemented without the use of the disk spacer opening liner 84, and the disk spacer opening liner 84 may be implemented without the inner section 86 being of a different material type.

Figure 8:
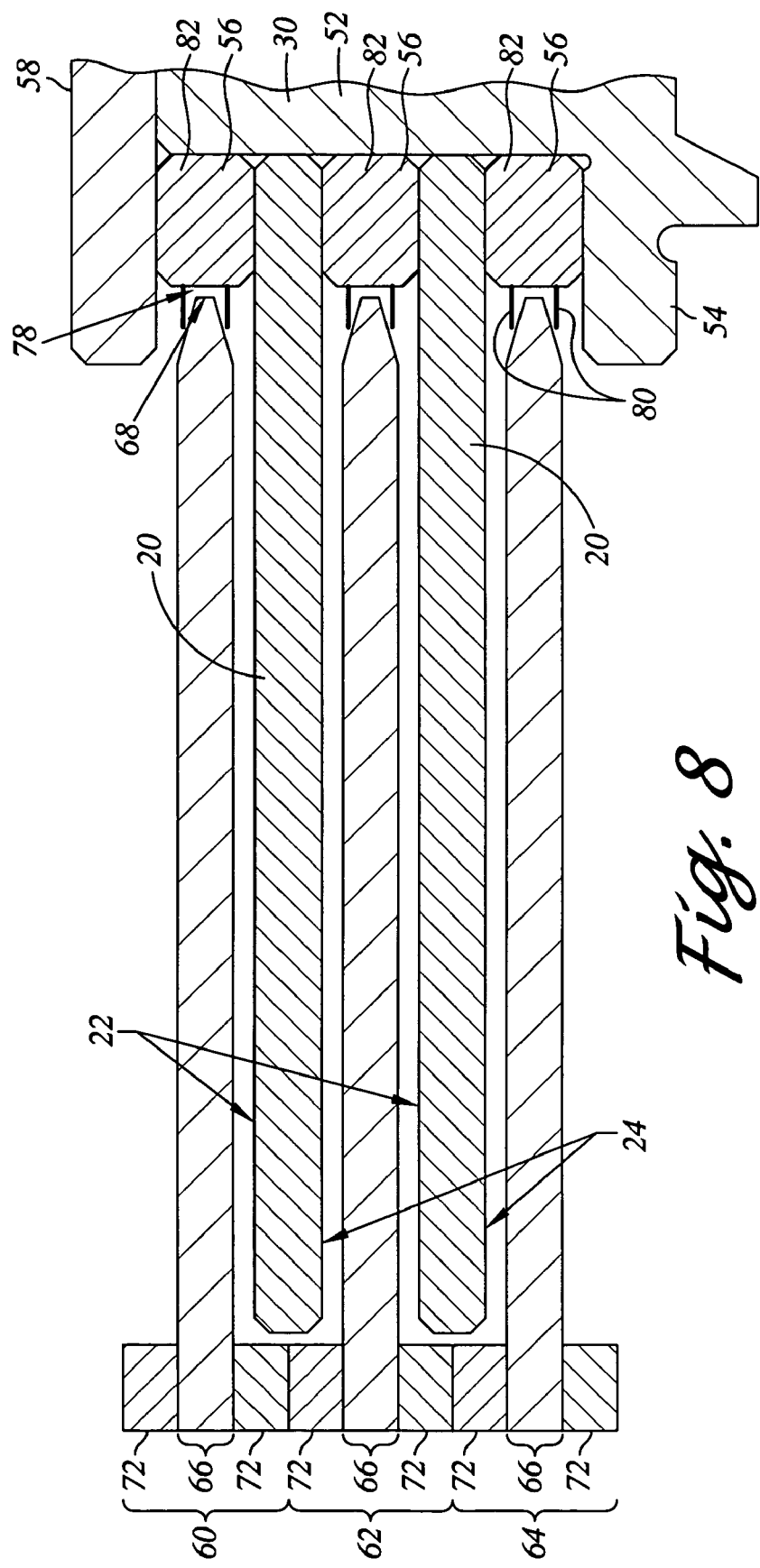
FIG. 8 is a view similar to that of FIG. 3, however, with disk spacers according to another embodiment.
Figure 9:
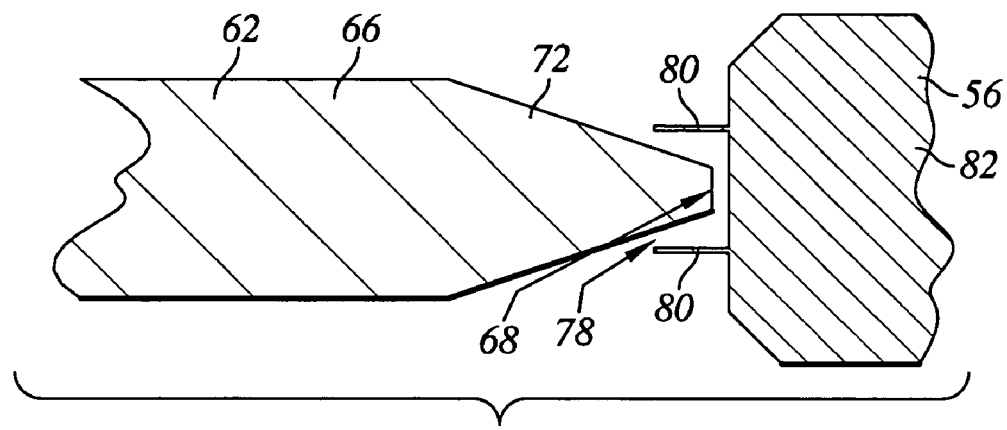
FIG. 9 is an enlarged cross sectional side view of a portion of a disk plate and disk spacer of FIG. 8.

Referring now to FIG. 8 there is depicted a view similar to that of FIG. 3, however, with disk spacers 56 according to another embodiment. FIG. 9 is an enlarged cross sectional side view of a portion of a disk plate 62 and disk spacer 56 of FIG. 8. In this embodiment the disk spacers 56 each includes disk spacer body 82 and a pair of flanges 80 radially extending from the disk spacer body 82. A circumferential disk spacer opening 78 is defined by the disk spacer body 82 and the flanges 84.

Figure 10:
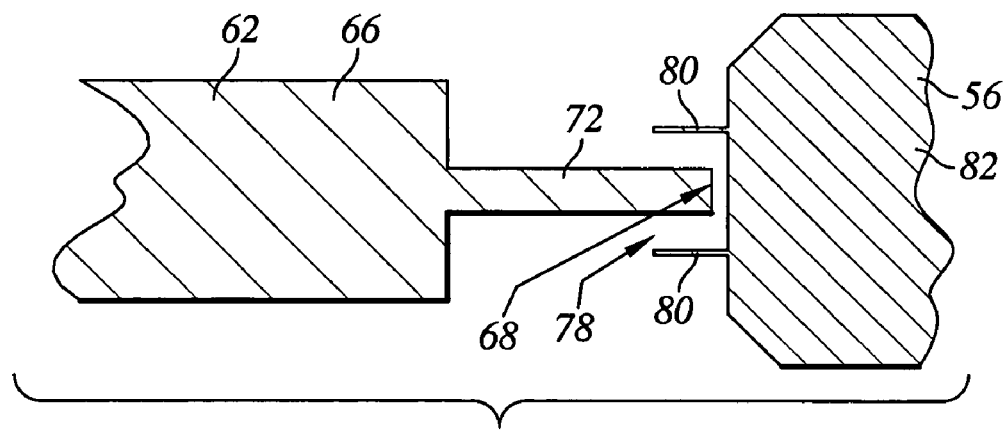
FIG. 10 is a view similar to that of FIG. 9, however, with a disk plate according to anther embodiment.

Referring now to FIG. 10 there is depicted a view similar to that of FIG. 8, however, with a disk plate according to yet another embodiment. In this embodiment, the inner section 70 has a substantially uniform thickness of the inner edge thickness t. As such, the inner section 70 may be step-shaped in relation to the plate body 66.

We claim:

1. A disk drive comprising:
a disk drive base;
a spindle motor hub rotatably coupled to the disk drive base and configured to rotate about an axis of rotation;
first and second disks disposed about the spindle motor hub; and
a disk spacer disposed about the spindle motor hub between the first and second disks, the disk spacer including a circumferential disk spacer opening; and
a disk plate coupled to the disk drive base, the disk plate including:
a plate body extending between the first and second disks for modifying air flow adjacent the first and second disks during operation of the disk drive; and
an inner edge extending from the plate body and disposed towards the hub, the inner edge being disposed within the disk spacer opening overlapping the disk spacer in a direction parallel to the axis of rotation for mitigating against contact between the inner edge and the first and second disks.

2. The disk drive of claim 1 wherein the disk spacer includes a disk spacer body, the disk spacer opening is formed in the disk spacer body, the disk spacer opening is groove-shaped.

3. The disk drive of claim 1 wherein the disk spacer includes a disk spacer body and a pair of flanges radially extending from the disk spacer body, the disk spacer opening defined by the disk spacer body and the flanges.

4. The disk drive of claim 1 wherein the disk plate includes an inner section, the inner section extends from the plate body towards the hub, the inner section includes the inner edge.

5. The disk drive of claim 4 wherein the inner section is tapered from the plate body to the inner edge.

6. The disk drive of claim 4 wherein the inner section has a substantially uniform thickness of the inner edge thickness.

7. The disk drive of claim 4 wherein the inner section is step-shaped in relation to the plate body.

8. The disk drive of claim 4 wherein the inner section is formed of a material different than the plate body.

9. The disk drive of claim 8 wherein the inner section is formed of a substantially electrically non-conductive material.

10. The disk drive of claim 1 wherein the disk spacer further includes a disk spacer opening liner disposed within the disk spacer opening, the disk spacer opening liner is formed of a material different than a remainder of the disk spacer.

11. The disk drive of claim 10 wherein the disk spacer opening liner is formed of a substantially electrically non-conductive material.

12. The disk drive of claim 1 wherein the plate body thickness is substantially uniform between the first and second disks.

13. The disk drive of claim 1 wherein the disk plate is a first disk plate, the disk drive further includes a second disk plate, the first disk is disposed between the first and second disk plates.

* * * * *